No. 12,168. REISSUED NOV. 10, 1903.

R. A. FESSENDEN.

WIRELESS TELEGRAPHY.

APPLICATION FILED OCT. 20, 1903.

Witnesses:

Louis A. Morris

J. M. Coffinberry

Inventor:

Reginald A. Fessenden

No. 12,168. Reissued November 10, 1903.

UNITED STATES PATENT OFFICE.

REGINALD A. FESSENDEN, OF WASHINGTON, DISTRICT OF COLUMBIA, ASSIGNOR OF ONE-THIRD TO DARWIN S. WOLCOTT, OF SEWICKLEY, PENNSYLVANIA.

WIRELESS TELEGRAPHY.

SPECIFICATION forming part of Reissued Letters Patent No. 12,168, dated November 10, 1903.

Original No. 706,737, dated August 12, 1902. Application for reissue filed October 20, 1903. Serial No. 177,829.

DIVISION A.

*To all whom it may concern:*

Be it known that I, REGINALD A. FESSENDEN, a citizen of the United States, formerly residing at Allegheny, in the county of Allegheny, in the State of Pennsylvania, but now residing at Washington, in the District of Columbia, have invented or discovered certain new and useful Improvements in Wireless Telegraphy, of which improvements the following is a specification.

The invention described herein relates to certain improvements in transmission of energy by electromagnetic waves, and has for its object the production of more efficient sending or generating conductors.

It is a further object of the invention to provide for the production of mechanical movements by the direct interaction of currents induced in the receiving-conductor by electromagnetic waves and constant or varying magnetic fields.

The invention is hereinafter more fully described and claimed.

Figure 1:
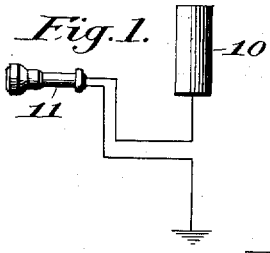
Figure 1:
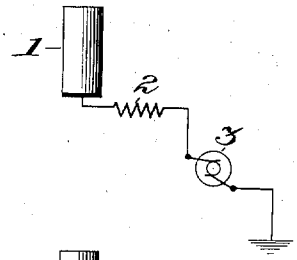
Figure 2:
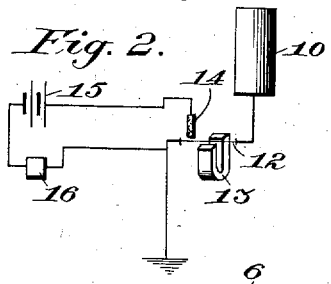
Figure 2:
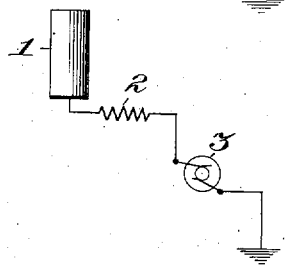
Figure 3:
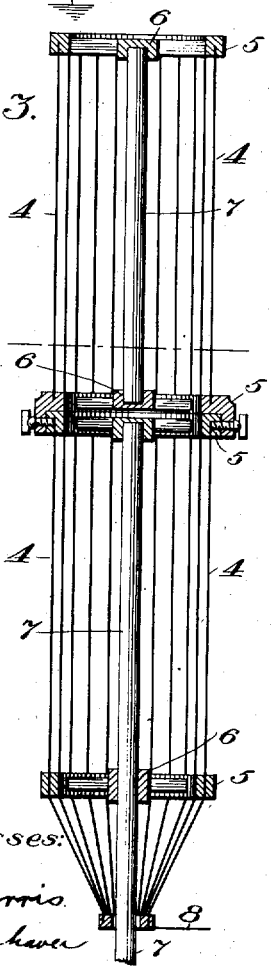
Figure 4:
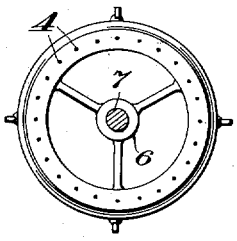
Figure 5:
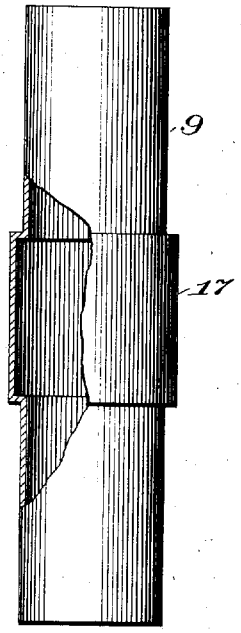

In the accompanying drawings, forming a part of this specification, Figure 1 is a diagrammatic view illustrating a form of apparatus for the practice of my invention. Fig. 2 is a similar view illustrating a modification of the apparatus at the receiving-station. Fig. 3 is a sectional elevation of one form of conductor. Fig. 4 is a top plan view of the same, and Fig. 5 is an elevation of a modification of the conductor.

In the experiments heretofore made in wireless transmission of energy, as in telegraphy, relatively high frequencies—*e. g.*, of the order of two million (2,000,000) periods or more per second—have been used. It is impossible to produce or utilize mechanical movements directly by the interaction of a constant or independently-varying magnetic field and a current induced by electromagnetic waves of such high periodicities, for the reason that either the element to be moved (as the diaphragm of a telephone) is incapable of such rapid vibrations or the vibrations are too rapid to be utilized. In order to utilize directly the interaction between currents induced by electromagnetic waves and a constant or independently-varying magnetic field to produce motion in one of two members of a receiving instrument, one member thereof consisting of a constant or independently-varying magnetic field, the sending-conductor is so constructed that its capacity or self-induction, or both, are large as compared with the value of the aerial wire commonly used in the art and distributed with practical uniformity along the conductor from or near its top to a point at or near the instrument. By thus increasing the capacity and self-induction of either of them the frequency of the electric oscillations in the conductors, and consequently of the waves generated, will be sufficiently low to produce utilizable motion in the instrument. By "low frequency" is meant low relative to the frequency hitherto used in wireless telegraphy.

The terms "sending-conductor" and "receiving-conductor" as hereinafter employed indicate all of the circuits of the sending and receiving stations from top to ground, if grounded, or, if not grounded, from one extreme end to the other extreme end, including all apparatus in series with the circuits, while the term "radiating portion" indicates substantially all of the sending-conductor from top or extreme end of same to a point at or near junction with the apparatus for effecting the oscillatory charging and discharging thereof, such as sparking terminals, transformer-coils, armature-windings, &c.

The self-induction of the sending-conductor can be regulated by increasing or decreasing the turns in the coil 2, formed in the wire connecting the radiating portion 1 with the generator 3. The capacity of the sending-conductor can be regulated in several ways—as, for example, by changing the superficial area of the radiating portion 1—by the employment of a medium as described in application No. 62,303, filed May 29, 1901, or reducing the height of the radiating portion without reducing its superficial area. A conductor of large capacity may be constructed, as shown in Fig. 3, having its radiating portion 1 in the form of a cylindrical cage, consisting of a number of parallel wires 4, secured at their ends to supporting-rings 5, provided with hubs or central sockets 6 for the reception of supporting-rods 7, formed of bamboo or other light non-conducting material. For convenience it is preferred to form the cylindrical cage in sections, which can be mechanically and electrically connected by the supporting-rings, as shown. This wire cage or cylinder can be connected to ground in any suitable manner, as by the wire 8, in which coils or turns may be formed to adjust the self-induction of the sending-conductor. As shown in Fig. 5, the radiating portion may be formed by a cylinder 9, having continuous metal walls. By employment of sending-conductors having large capacity distributed with approximate uniformity or regularity over a large portion of its length the height thereof may be reduced without affecting the efficient travel of the electromagnetic waves radiated therefrom. When low frequency is obtained by increasing the capacity alone, or by increasing both capacity and self-induction, the curve of resonance is broader than is obtained by increasing the self-inductance alone, though in the former cases the amount of energy radiated for a given voltage and length of sending-conductor is more than is obtainable with a short resonance curve. Hence to obtain the best results it is preferred to use the two former methods and to conjoin with them at the receiving-station means for increasing the selective effect of the receiving-conductor, which means are described and claimed in application No. 62,303, filed May 29, 1901.

By increasing the capacity and self-induction, or either of them, the stated advantages of a low frequency of oscillations in the conductor and a shorter radiating portion are obtained, and in addition thereto it is possible with frequencies of one hundred thousand (100,000) or less to substitute for the induction-coil, connected in the manner now in vogue, a source of alternating voltage as the exciting-generator—as, for example, the exciting-generator may be a dynamo, a transformer connected to a dynamo, or an induction-coil producing low-frequency oscillations in a primary circuit, the secondary circuit forming the source of alternating voltage and having one terminal connected to the radiating portion and the other terminal to the ground. In order that a dynamo may be used to produce such a high periodicity which, though low as compared with periodicities heretofore used in wireless transmission of energy, as in telegraphy, is very high as compared with those generated by dynamos commonly used in electrical engineering, it must possess several distinct characteristics. First, it should generate pure sine-waves, because, as is well known, this is the only form of curve which gives perfect resonance. With a dynamo giving such a curve forming a part of a suitably-constructed sending-conductor it is possible to wind the dynamo so as to generate, for example, only a thousand volts on open circuit, and yet by means of resonance effects to obtain a voltage of a hundred thousand volts on the sending-conductor. It is possible to obtain resonance effects by use of a dynamo of low internal resistance, as a portion of a sending-conductor of large capacity or self-induction, or both, having these electrical constants suitably proportioned so that the sending-conductor has a natural period identical with that of the dynamo. This obviously renders the machine much cheaper to build and much easier to manipulate for signaling purposes than a dynamo or dynamo and transformer built to give one hundred thousand volts directly. Second, the armature must be of low internal resistance, because if of a high resistance the oscillations will be dampened and high resonance voltages cannot be produced. Third, it must be well ventilated, because during the period of sending a signal the current may run up to hundreds or even thousands of amperes. Fourth, the length of wire in the armature must be as small as possible compared with the length of the sending-conductor, for otherwise the electrical constants of the sending-conductor—*i. e.*, of the circuit from the top of the conductor to the ground including the armature—will be determined too largely by that part of the circuit between the armature terminals and the amount of radiation from the given voltage on the sending-conductor would be much less than would be the case if the armature had relatively lesser length of wire. In other words, the self-induction and capacity of the armature must be as small a fraction as possible of the self-induction and capacity of the sending-conductor. When the dynamo is said to be in resonance with the sending-conductor, it is meant that the natural period of the whole conductor, from the top of the conductor to the ground including the armature, is the same as the periodicity of the dynamo. Fifth, it is also essential that all iron magnetically influenced by currents in the conductor should be so proportioned and distributed as not to effect the shape of the curve of voltage or to cause loss of power by hysteresis, as in such case there would be too much dampening. For these reasons the dynamo may be constructed with a fixed armature containing no iron, having the air-gap as long as possible consistent with a high magnetic flux density, revolving pole-pieces so shaped as to produce sine-waves as closely as possible, and the revolving parts formed of magnetic material of high tensile strength, such as nickel-steel.

A dynamo with the revolving part having a high peripheral speed of one-half mile per minute has given ten thousand periods per second, and with a revolving part formed of nickel-steel a peripheral speed of five miles per minute can be safely maintained, giving thereby one hundred thousand periods per second. Such peripheral speed can be obtained by the employment of steam-turbine.

It will be evident to those skilled in the art that instead of using a dynamo giving a thousand volts a dynamo giving a hundred volts may be used with a transformer stepping up to a thousand volts; but in such case the length of wire in the secondary of the transformer should have the same relation to the length of the whole conductor, including the secondary of the transformer, as stated in reference to a dynamo giving a thousand volts.

The best results are obtained when the frequency of the source of alternating voltage, as a dynamo, is equal or approximately equal to the natural frequency of the radiating system. The adjustment of frequencies can be effected by changing the speed of the dynamo. The reason why the best results are obtained when the frequency of the dynamo or its equivalent (as a transformer connected to a dynamo) is equal or approximately equal to that of the natural frequency of the radiating circuit is that when the frequency of the dynamo is less than this the chief effects are electrostatic and magnetic in their nature and there is practically no electromagnetic radiation. Under these circumstances signals cannot be transmitted to any great distance, as the electrostatic and magnetic effects fall off as a high power of the distance. As the frequency of the dynamo is increased the effects of electrostatic and magnetic induction continue to predominate until the frequency of the dynamo approaches that of the sending-conductor. When this point is reached, if the radiating portion of the sending-conductor has a length which is a large fraction of the total length of the circuit a large amount of energy can be radiated in the form of electromagnetic waves and signals be transmitted a long distance. The reason why the length of the radiating portion of the sending-conductor should be a large fraction of the total length of the circuit is that if otherwise the circuit would be a poor radiator. If, for example, the length of the radiating portion of the sending-conductor is five feet and the length of the wire in the armature is five miles, the amount of energy radiated would be very small compared to what it would be if the length of wire in the armature were only five hundred feet and the radiating portion of the sending-conductor five feet. A further advantage incident to the employment of low frequencies is the fact that there is, as I have discovered, less absorption of the electromagnetic force as the waves travel along the ground than when the waves have high frequencies.

In the form of apparatus shown in Fig. 1 the generator 3 (in this case a dynamo) has one pole connected to ground and the other pole connected by a wire having an inductance 2 to the radiating portion 1. The sending-conductor which may have its radiating portion of any suitable form, but preferably that shown in either Figs. 3 and 5, has its capacity or self-induction, or both, adjusted in the manner described, that the electromagnetic waves radiated will have low frequency. At the receiving-station the receiving-conductor 10 is connected to one terminal of a translating device 11, as a telephone, the opposite terminal thereof being connected to the ground. As the frequencies of the waves which induce currents in the conductor 10 are low, the diaphragm of the telephone will respond thereto, and the vibrations of the diaphragm will produce audible notes.

In Fig. 2 is shown another form of receiving apparatus. A portion of the ground connection of the receiving-conductor 10 is formed by a piece of fine wire 12, held in tension between the poles of a magnet 13. By the interaction between the currents passing along the wire 12 and the magnetic field the wire is caused to vibrate and make and break contact with the microphonic contact-point 14, which is so adjusted as to be normally out of contact with the wire 12. A circuit, including a battery 15 and relay 16 or other translating device, is formed in part by the contact 14 and the wire 12, so that whenever the secondary circuit is completed by the vibration of the wire the relay will be energized.

If the radiating portion be made, as shown in Fig. 5, with varying superficial dimensions—*e. g.*, with a swell or enlargement 17—the electromagnetic waves generated from its different surfaces will have different periodicities, as the periodicity of electromagnetic waves depends, in part at least, on the capacity of the radiating portion at the sending-station, a similarly-constructed conductor may be used at the receiving-station, or two simple receiving-conductors suitably tuned may be used.

By the use of a sending-conductor of large capacity and having that capacity uniformly distributed certain specific advantages are obtained which cannot be obtained by any other style of conductor. When the capacity is not distributed with substantial uniformity, it is impossible to obtain a sine form of electromagnetic wave, and this form of wave gives very much better results in that it permits of the voltage being increased by resonance to any extent, depending only on the resistance losses. For example, if the resistance be low it is possible with an impressed voltage of, say, five to reach a resonant voltage of two hundred or more with a capacity distributed uniformly—*i. e.*, with a sine-wave, while if the capacity be distributed, so as to give, a parabolic wave with a voltage of five, it is not possible to obtain by resonance a higher voltage than twenty-five, since when the capacity is large the resistance is also low on account of the fact that the currents with these high frequencies flow over the surface of the sending-conductor it follows that with a sending-conductor of large capacity uniformly distributed it is possible to get a sine-wave and a low resistance—*i. e.*, conditions necessary and favorable for the production of large resonant voltages from small impressed voltages, and hence conditions which permit of sending over longer distances than if the sending-conductor were of large capacity not uniformly distributed or of small capacity uniformly distributed. By the term "large capacity" as herein used is meant a capacity large as compared with the capacities of wires heretofore commonly used in the art, and by the term "uniformly distributed" is meant distributed with substantial uniformity over the radiating portion.

The effect of locally increasing the superficial area of the sending-conductor or of locally increasing the capacity by any other suitable means is to produce two or more sets of waves of different periodicities, the periodicity of the first being dependent upon the electrical constants of the sending-conductor as a whole and the periodicity of the other depending upon the position and amount of localized increase of capacity in the same way as by attaching a weight or spring to a piano-wire between its extremities additional vibrations in the wire are created.

By the term "electromagnetic waves" as used herein is meant waves of a wave length long in comparison with the wave length of what are commonly called "heat-waves" or "radiant heat." By "grounded conductor" is meant a conductor grounded either directly or through a capacity, an inductance, or a resistance, so that the current in the conductor flows through the conductor to ground, and vice versa, when electromagnetic waves are generated. The terms "tuned" and "resonant" are used herein as one including the other.

This invention involves the discovery of the desirability and practicability of using radiant electromagnetic waves of a frequency lower than has heretofore been recognized as desirable or practicable and in the devising of a considerable number of very meritorious features combined in an apparatus or system whereby the energy of such waves may be successfully radiated in quantities sufficient for practical use over long distances.

In constructing an apparatus that will give practical results with such low-frequency waves novel features have been devised, some of which are of general utility in generating and radiating waves of the higher and more usual frequencies, and these are hereinafter claimed in terms which will cover the use thereof in other than the specific connection for which they are primarily intended.

The amount of radiation possible for a given system is dependent, among other things, upon the frequency, and, other things being equal, the amount is less for the lower frequencies. In order, therefore, to radiate large amounts of energy by low-frequency waves, I take advantage of the rise of voltage due to resonance effects brought about by a proper proportioning of inductance and capacity, so that the phases of the impressed electromotive force and the current coincide in time.

Resonance effects in a vertical conductor grounded at one end depend upon the quantities of the conductor which make it a good oscillator, and this is measured by the amount that the resistance is less than the square root of four times the inductance divided by the capacity—that is, the amount of $R^2$ is less than $\frac{4L}{C}$; but in such a conductor the best conditions of resonant oscillation require that the length of conductor be one-fourth the length of the fundamental wave oscillating therein. It is evident then that if the conductor be a plain wire of ordinary size and the capacity and inductance employed for tuning be small the wave length therein will be substantially the length in the ether of a wave of the same frequency, which for a frequency of ninety thousand is two miles, and the resistance which acts to cut down oscillation would be that of eight miles of wire for each complete wave or oscillation, so that the tenth wave or oscillation, for example, would have been subject to the resistance losses of eighty miles of wire. Where, however, the inductance and capacity are large, the length of the sending-conductor and its subsequent resistance detrimental to oscillation may be greatly decreased, for the frequency of the fundamental wave—that is, the natural period of such a conductor—varies inversely as the square root of the capacity multiplied by the square root of the inductance—that is, inversely as the quantity or value $\sqrt{L\,C}$. Now since the condition of resonance is that $C\,L\,\omega^2=1$ it is evident that instead of increasing L and C in equal proportions to get a large total $\sqrt{L\,C}$ necessary for a good oscillator one of these factors may be increased, while the other remains constant or is decreased. Large inductance, however, would involve large resistance, which is bad, as shown, while increase of capacity in accordance with my invention is advantageous in many ways, as will be pointed out. I therefore make the capacity large and the induction correspondingly small, thereby making the quantity $\sqrt{L\,C}$ large and correspondingly shortening my sending-conductor and greatly reducing my resistance.

The large capacity I distribute uniformly over substantially all of the radiating portion of the conductor, thereby further reducing instead of increasing the resistance and at the same time providing a large effective radiating-surface. The further reason why the capacity is thus distributed is that with any other arrangement it is difficult to get a pure sine form of electromagnetic wave, because any local increase of capacity tends to produce two or more sets of waves of different periodicities.

In order that I may radiate large amounts of energy, I make the radiating-conductor over which the capacity is distributed a large fraction of the total length of the sending-conductor. This points another advantage of relatively and absolutely large capacity and corresponding inductance, for unless I was able to greatly shorten the sending-conductor, as I do by their use, it would be difficult to construct a low-frequency radiating-conductor which would be so large a fraction of the length of the whole sending-conductor.

From the above it will be seen that by my invention the internal current losses due to ohmic resistance are largely decreased by using large total capacity and small inductance for the tuning, thereby shortening the length of sending-conductor necessary for a given frequency or for a given wave length in the ether. The shortening of the sending-conductor also facilitates the use of a radiating-conductor which is a large fraction of the wave length. The distribution of the capacity makes possible a better form of wave, decreases the resistance of that part of the sending-conductor, and further increases the radiating-surface.

With this system, whereby large amounts of energy may be radiated at a low frequency, I am able to substitute for the induction-coil and spark-gap now in use a dynamo or similar source of alternating voltage.

If the dynamo be used without the spark-gap, I am able at once to produce a continuous train of radiant waves of substantially uniform strength, as distinguished from the well-known systems wherein the spark-discharge starts a train of waves of rapidly-diminishing power followed by relatively long intervals of no radiation. Furthermore, where the spark discharge is used I am able, by reason of the persistent oscillation coupled with the low frequency, to greatly diminish and, indeed, to completely bridge over the intervals of no radiation, for with ten thousand sparks per second exciting a sending-conductor of a periodicity of ninety thousand it is evident that if each spark gives only ten oscillations before being damped sufficiently to stop radiation every tenth oscillation will coincide with the first oscillation produced by the next succeeding spark. Thus the radiation will be practically continuous, and the total energy of the first oscillation produced by the spark will be divided between only nine electromagnetic waves. Now if the frequency were one million and the sparks ten thousand per second it would be necessary to have an oscillator capable of one hundred useful oscillations of a power sufficient to produce useful radiations in order to maintain practically continuous radiation. The energy of a single spark in that case would be divided between one hundred radiant electromagnetic waves and would be too small for practical use over commercial distances.

From the above it will be seen that by keeping $R^2$ small and the frequency low I am able to radiate practically continuous streams of electromagnetic waves of an energy sufficient for practically continuous effects at the receiving-station. Even in the case where the sets of oscillations do not quite overlap in time it is evident that the intervals of inactivity are decreased by the increase of the time of a train to ten times what it would be with a frequency of one million. This is a great advantage in cases where the receiver is tuned to the period of the transmitter, for the regularity, continuity, and great energy of the waves improve the resonance in a manner that by use of proper devices at the receiving-station more than compensates for the rather broad curve of resonance involved in any use of large capacity for tuning purposes.

In practice it is found that substantial uniformity of distribution of capacity may be obtained by making the conductor uniform in figure from the top to a point at or near the bottom, as is indicated in Fig. 3. It has been held by some that the capacity of the upper portion of a vertical conductor of uniform cross-section is much smaller than that of the middle or lower portions by reason of its greater distance from ground; but I have found by actual measurement that this is practically not the case, the upper portions having practically the same capacity as the lower portions. The capacity of a conductor with respect to ground is mainly dependent upon its size and shape and not upon its distance from the ground when the distance between the conductor and ground is not small.

I claim herein as my invention—

1. A sending-conductor for electromagnetic waves, having a large capacity distributed with substantial uniformity over its radiating portion, substantially as set forth.

2. A sending-conductor for electromagnetic waves, having its capacity so adjusted that the waves radiated therefrom have a low frequency, substantially as set forth.

3. A sending-conductor for electromagnetic waves, having its capacity and inductance so adjusted that the waves radiated therefrom have a low frequency, substantially as set forth.

4. In a system for transmission of energy by electromagnetic waves, the combination of a source of alternating voltage and a conductor in series therewith forming a sending-conductor said sending-conductor being adapted to radiate electromagnetic waves and having its radiating portion of a length which is a large fraction of the quarter-wave length produced by the alternating source in the medium surrounding the radiating portion, substantially as set forth.

5. In a system for transmission of energy by electromagnetic waves, the combination of a source of alternating voltage and a conductor in series therewith forming a sending-conductor said sending-conductor being adapted to radiate electromagnetic waves having its radiating portion of a length which is a large fraction of the length of the sending-conductor, substantially as set forth.

6. In a system for transmission of energy by electromagnetic waves, the combination of a source of alternating voltage generating groups of impulses of low frequency and a conductor in series therewith forming a sending-conductor said sending-conductor being adapted and proportioned to radiate electromagnetic waves, and being tuned to the source of alternating voltage, substantially as set forth.

7. In a system for the transmission of energy by electromagnetic waves, the combination of an alternating-current dynamo and a conductor in series therewith forming a sending-conductor said sending-conductor being tuned to the dynamo and adapted to radiate electromagnetic waves, substantially as set forth.

8. In a system for the transmission of energy by electromagnetic waves, the combination of a sending-conductor so proportioned as to radiate waves of low frequency and an alternating-current dynamo having its terminals connected respectively to the radiating portion of the sending-conductor and to ground, the dynamo being so adjusted that its periodicity is the same or approximately the same as the natural period of the sending-conductor, substantially as set forth.

9. A sending-conductor for electromagnetic waves, formed by an alternating-current dynamo and a conductor in series therewith, one pole of the dynamo being grounded, the sending-conductor thus formed being so proportioned as to radiate waves of low frequency, substantially as set forth.

10. A sending-conductor for electromagnetic waves so proportioned as to radiate waves of low frequency in combination with a source of alternating voltage having its terminals connected respectively to the radiating portion of the sending-conductor and to ground, the voltage-generator being so adjusted that its periodicity is the same or approximately the same as the natural period of the system when so connected, substantially as set forth.

11. A sending-conductor for electromagnetic waves, formed by a source for continuously generating alternating voltage and a conductor in series therewith, one pole of the source of alternating voltage being grounded, the sending-conductor thus formed being so proportioned as to radiate waves of low frequency, substantially as set forth.

12. A system for signaling by electromagnetic waves having in combination a conductor adapted to radiate waves of low frequency, and a receiver dependent for its action upon a constant or independently-varying magnetic field and adapted to respond to currents produced by said waves, substantially as set forth.

13. A sending-conductor for electromagnetic waves of a length much less than a quarter of the length of an ether-wave, having a frequency equal to the natural period of said sending-conductor, and having a radiating portion which is a large fraction of its total length.

14. A sending-conductor for electromagnetic waves having a natural period of vibration much lower than the period of an ether-wave four times its length, whereby its radiating portion may be a relatively large fraction of the total length of said sending-conductor.

15. A sending-conductor for electromagnetic waves tuned to a desired low frequency by large capacity and small inductance.

16. A sending-conductor for electromagnetic waves having small inductance and tuned to a desired low frequency by a suitably-proportioned large capacity.

17. A sending-conductor for electromagnetic waves having low resistance, small self-induction and great capacity, substantially as and for the purpose set forth.

18. A sending-conductor for electromagnetic waves having low resistance, small self-induction and great capacity so correlated as to support persistent oscillation of a frequency much less than that of an ether-wave of a length four times that of said sending-conductor.

19. A system for transmission of energy by electromagnetic waves in combination with a radiating-conductor and a source of alternating electrical energy or potential, said radiating-conductor and source being coördinated and relatively adjusted to radiate a substantially continuous stream of electromagnetic waves.

20. A system of transmission of energy by electromagnetic waves including in combination a radiating-conductor and a source of alternating electrical energy or potential, said radiating-conductor and source being coördinated and relatively adjusted to generate and radiate a substantially continuous stream of electromagnetic waves.

21. A system for transmission of energy by electromagnetic waves, including in combination a radiating-conductor and a source of alternating electrical energy or potential, said radiating-conductor and source being coördinated and relatively adjusted to radiate a substantially continuous stream of electromagnetic waves of substantially uniform strength.

22. A sending-conductor for electromagnetic waves having a large capacity distributed with substantial uniformity over its radiating portion, said large-capacity radiating portion being formed by a single continuous conductor of large area and substantially uniform cross-sectional or peripheral dimensions, substantially as set forth.

23. In a system for the transmission of energy by electromagnetic waves, a conductor grounded at one end only, said conductor comprising a portion of a length which is equal to a large fraction of the quarter length in the surrounding medium of a wave having the same time-period as the natural or free period of said grounded conductor, said portion being composed of a single continuous conductor of an area great as compared with that of a wire of equal length, said area being distributed with substantial uniformity and equality throughout the length of said portion, substantially as set forth.

24. In a system for the transmission of energy by electromagnetic waves, a conductor grounded at one end only and having a portion comprising a large fraction of its total length, composed of a single continuous conducting-surface of an area great as compared with that of a wire of equal length, said area being distributed with substantial uniformity and equality throughout the entire length of said portion, substantially as set forth.

In testimony whereof I have hereunto signed my name.

REGINALD A. FESSENDEN.

Witnesses:
C. A. LONGFELLOW,
WM. H. DE LACY.